(12) United States Patent
Zhang et al.

(10) Patent No.: US 12,724,807 B1
(45) Date of Patent: Sep. 1, 2026

(54) SYSTEMS AND METHODS FOR HYBRID LEXICAL-VECTOR RETRIEVAL IN RETRIEVAL-AUGMENTED GENERATION MODELS

(71) Applicant: Morgan Stanley Services Group Inc., New York, NY (US)

(72) Inventors: Yu Zhang, Hempstead, NY (US); Jing Shen, Great Neck, NY (US); Huifeng Jason Li, Highland Park, NJ (US); Taotao Jiang, Weehawken, NJ (US); Monika Nica, Ridgefield, CT (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/420,230

(22) Filed: Dec. 15, 2025

(51) Int. Cl.
*G06F 16/334* (2025.01)
*G06F 16/335* (2019.01)

(52) U.S. Cl.
CPC ........ *G06F 16/3347* (2019.01); *G06F 16/335* (2019.01)

(58) Field of Classification Search
CPC ........................... G06F 16/3347; G06F 16/335
See application file for complete search history.

(56) References Cited

U.S. PATENT DOCUMENTS 11,580,301 B2 2/2023 Narayan et al.
12,182,125 B1 12/2024 Buniatyan
12,346,337 B1 * 7/2025 Palatnik De Sousa ...................... G06F 16/24578
12,450,274 B1 * 10/2025 Jain ......................... G06F 16/35
2010/0153315 A1 * 6/2010 Gao .................. G06F 16/24578 707/E17.108
2025/0131289 A1 4/2025 Larson et al.
2025/0165480 A1 * 5/2025 Raudaschl ........ G06F 16/24578
2025/0190460 A1 6/2025 Madisetti et al.
2025/0209108 A1 * 6/2025 Yang ....................... G06F 16/93
2025/0265249 A1 * 8/2025 Buniatyan ................ G06N 3/08
2025/0292110 A1 9/2025 Jain et al.
2025/0322087 A1 10/2025 Salarian et al.
2026/0030274 A1 * 1/2026 Croskey ............ G06F 16/33295
2026/0072918 A1 * 3/2026 Meghwani ........ G06F 16/24578
2026/0072960 A1 * 3/2026 Zhang ................... G06F 16/334

* cited by examiner

*Primary Examiner* — Etienne P Leroux
(74) *Attorney, Agent, or Firm* — K&L Gates LLP

(57) ABSTRACT

Systems and methods perform hybrid lexical-vector retrieval in a retrieval-augmented generation (RAG) framework. A user query is pre-processed using named-entity recognition, date standardization, and optional out-of-domain detection. The system performs both lexical search and semantic vector similarity search over a corpus of document chunks, generating ranked candidate sets that are merged by elevating overlapping results and interleaving remaining items according to a predetermined rule. A top subset of chunks is selected based on the combined ranking and provided to a large language model (LLM), together with intent-specific instructions determined through query-classification logic. The LLM generates an answer grounded in the retrieved material and formatted according to a standardized template associated with the detected intent.

23 Claims, 9 Drawing Sheets

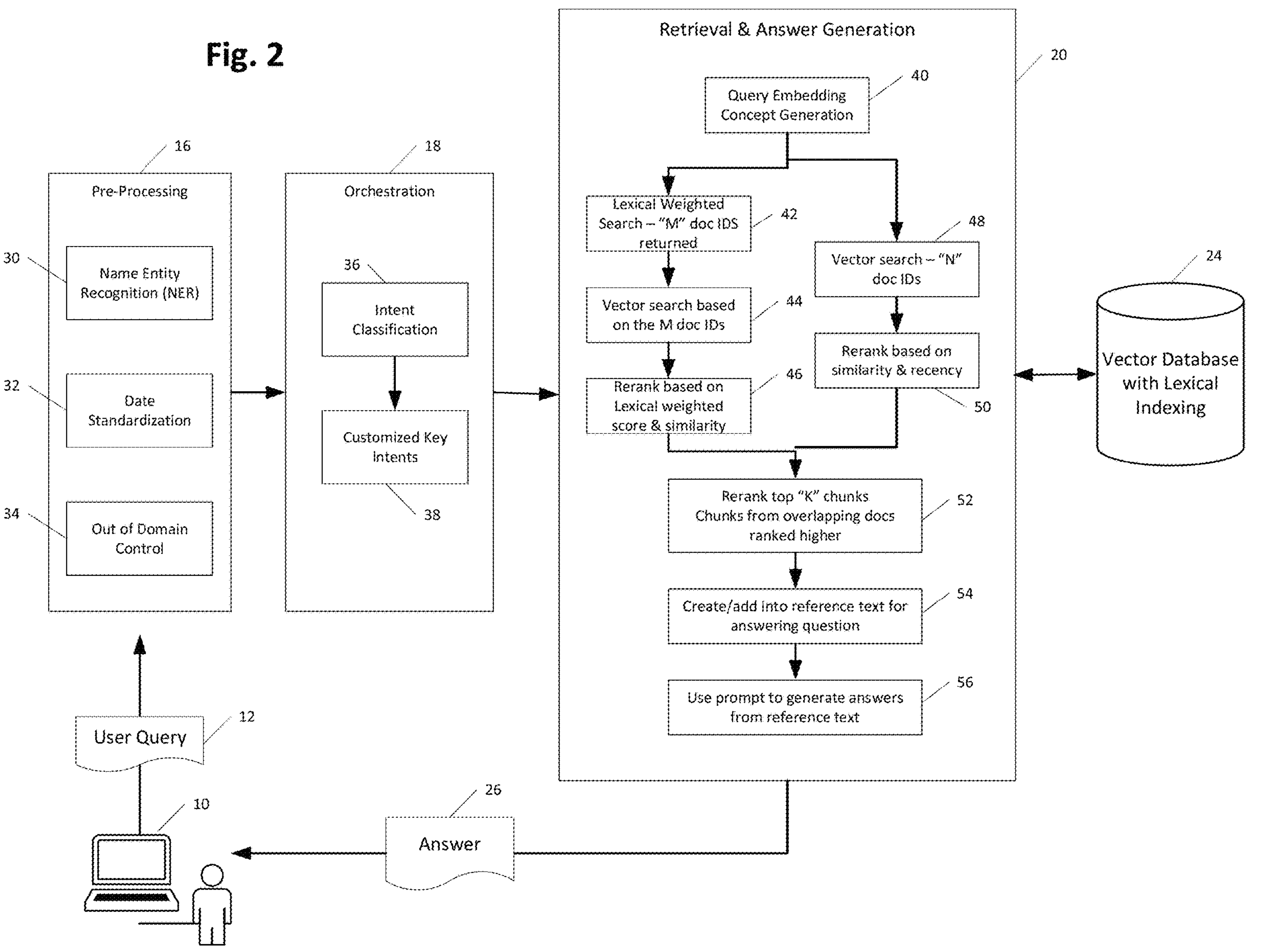
Fig. 2
Pre-Processing
16
Name Entity Recognition (NER)
30
Date Standardization
32
Out of Domain Control
34
Orchestration
18
Intent Classification
36
Customized Key Intents
38
Retrieval & Answer Generation
20
Query Embedding Concept Generation
40
Lexical Weighted Search – "M" doc IDS returned
42
Vector search based on the M doc IDs
44
Rerank based on Lexical weighted score & similarity
46
Vector search – "N" doc IDs
48
Rerank based on similarity & recency
50
Rerank top "K" chunks Chunks from overlapping docs ranked higher
52
Create/add into reference text for answering question
54
Use prompt to generate answers from reference text
56
Vector Database with Lexical Indexing
24
Answer
26
User Query
12
10

Select top K results
Results common to both sets of results
Alternating results from each list
Top N Vector Search Results
Top M Lexical Search Results

| Query | Category | Query Date | Date Range | Logic |
|---|---|---|---|---|
| How much did SOFR rise in July? | Explicit date range | 8/21/2025 | 7/1/2025 – 8/21/-2025 | Given month + one period extension for day/month/quarter/year |
| Core US CPI for last month | Implicit date range | 8/21/2025 | 7/22/2025-8/21/2025 | Implied last one month range |
| Main G10 central bank events in July 15 week? | Special | 8/21/2025 | 7/8/2024-7/14/2024 | Central bank events in week ahead is published in prior week |
| CIO IT budgets 2024, 2024 | Special | 8/21/2025 | 3/22/2024-8/21/2025 | CIOs report is published every quarter – last 3 months ago |
| What is most recent view on obesity market | Default | 8/21/2025 | 2/22/2024-8/21/2025 | Same – last 4 months of recent/current queries |

Fig. 6

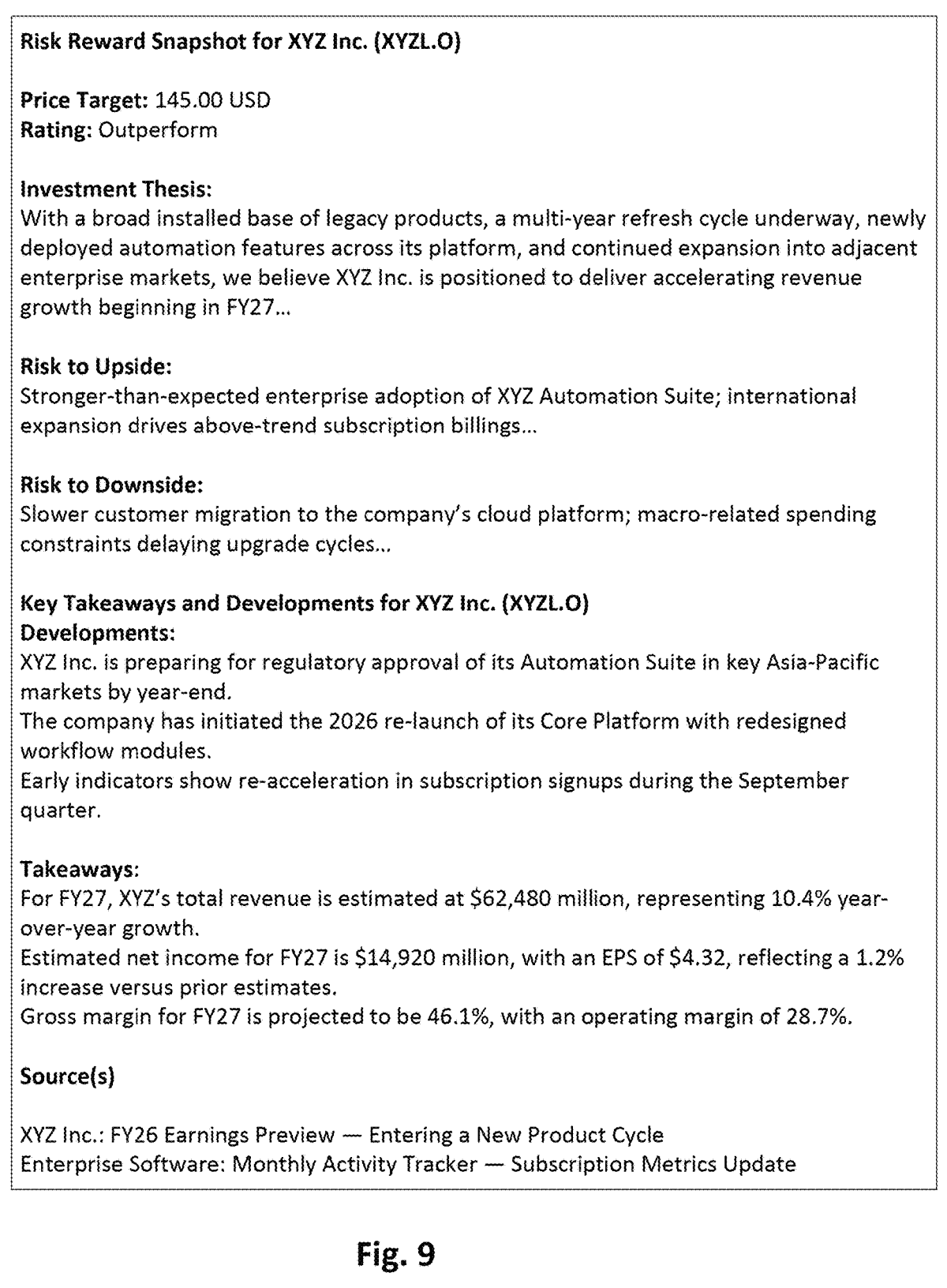

Risk Reward Snapshot for XYZ Inc. (XYZL.O)

Price Target: 145.00 USD
Rating: Outperform

Investment Thesis:
With a broad installed base of legacy products, a multi-year refresh cycle underway, newly deployed automation features across its platform, and continued expansion into adjacent enterprise markets, we believe XYZ Inc. is positioned to deliver accelerating revenue growth beginning in FY27...

Risk to Upside:
Stronger-than-expected enterprise adoption of XYZ Automation Suite; international expansion drives above-trend subscription billings...

Risk to Downside:
Slower customer migration to the company's cloud platform; macro-related spending constraints delaying upgrade cycles...

Key Takeaways and Developments for XYZ Inc. (XYZL.O)
Developments:
XYZ Inc. is preparing for regulatory approval of its Automation Suite in key Asia-Pacific markets by year-end.
The company has initiated the 2026 re-launch of its Core Platform with redesigned workflow modules.
Early indicators show re-acceleration in subscription signups during the September quarter.

Takeaways:
For FY27, XYZ's total revenue is estimated at $62,480 million, representing 10.4% year-over-year growth.
Estimated net income for FY27 is $14,920 million, with an EPS of $4.32, reflecting a 1.2% increase versus prior estimates.
Gross margin for FY27 is projected to be 46.1%, with an operating margin of 28.7%.

Source(s)

XYZ Inc.: FY26 Earnings Preview — Entering a New Product Cycle
Enterprise Software: Monthly Activity Tracker — Subscription Metrics Update

Fig. 9

SYSTEMS AND METHODS FOR HYBRID LEXICAL-VECTOR RETRIEVAL IN RETRIEVAL-AUGMENTED GENERATION MODELS

BACKGROUND

In the financial securities research industry, sell-side firms produce research reports, models, commentary, and related analytical materials concerning equities, fixed-income instruments, macroeconomic developments, commodities, and other financial topics. These firms support buy-side clients such as institutional investors, pension funds, hedge funds, and asset managers by providing not only published reports but also real-time responses to client inquiries. Sell-side analysts are expected to deliver answers that are accurate, timely, consistent with published materials, and aligned with internal guidelines. Sell-side analysts are generally required to rely on the contents of published research and to respond in a manner that reflects the firm's view of an issuer or sector at any given time, while avoiding statements that are outdated, incomplete, or inconsistent with prior publications.

To increase efficiency and consistency in interacting with buy-side clients, financial institutions have explored the use of generative artificial intelligence systems. Some of these systems incorporate Retrieval-Augmented Generation (RAG) pipelines, in which a large language model (LLM) generates an answer based on contextual material retrieved from an underlying research corpus. In a typical RAG framework, documents are segmented into chunks, embedded into a vector space, stored in a vector database, and later retrieved based on similarity to an embedded representation of the user query. The retrieved chunks are then provided to the LLM, which synthesizes a natural-language response grounded in the retrieved content. RAG-based approaches have therefore been viewed as a means of enabling LLMs to answer questions using firm-approved research rather than relying solely on general-purpose knowledge encoded in the model's parameters.

However, conventional RAG implementations used in sell-side research environments exhibit several limitations that reduce their accuracy and reliability. Traditional RAG systems often depend primarily on semantic vector similarity search, which may overlook relevant documents or content that are identifiable only through lexical signals such as company names, analyst names, ticker symbols, country or sector identifiers, or other metadata commonly used in financial research indexing. Vector-only retrieval may also surface documents that are marginally similar in concept but irrelevant for the specific financial entity or time period referenced in the query. As a result, existing systems may return answers that are incomplete, imprecise, insufficiently recent, or misaligned with the user's intended subject matter.

In addition, existing RAG pipelines used in enterprise research environments may incorporate only limited forms of query interpretation and retrieval logic. User queries in financial contexts often reference entities, dates, metrics, or research concepts in varied or domain-specific ways, and traditional RAG implementations may not consistently account for such variations when preparing the query for retrieval. Likewise, conventional retrieval frameworks may rely on a single retrieval modality, such as purely semantic vector similarity, without incorporating complementary lexical or metadata-driven signals that can be important in financial research corpora. As a result, existing systems may retrieve contextual material that is incomplete, imprecise, or not optimally matched to the user's query, and downstream answer-generation components may not consistently produce structured, comprehensive responses aligned with the conventions and expectations of sell-side research communication. These characteristics of traditional RAG solutions reflect the general constraints of generic retrieval and generation pipelines when applied to large, continuously updated bodies of financial research materials.

SUMMARY

In one general aspect, the present invention is directed to computer-implemented hybrid RAG systems and methods for generating an answer to a user query. The RAG system is hybrid in that it relies on both lexical and vector similarity searches to identify relevant document chunks that are ultimately supplied to a large language model (LLM) for answer generation. By combining lexical and semantic retrieval modalities and merging their results using a structured hybrid-ranking process, the system increases retrieval precision, improves contextual grounding, and produces answers that more accurately reflect the content of an underlying research corpus.

In various embodiments, the system includes a vector database that stores document chunks and their corresponding vector embeddings, as well as a lexical indexing system that stores lexical index entries for those same chunks. A retrieval-augmented generation (RAG) system, implemented using one or more programmed processors, communicates with both the vector database and the lexical index. The RAG system receives a user query, generates an embedded representation of that query, and executes two complementary retrieval operations: a lexical search that produces M ranked candidate chunks, and a vector similarity search that produces N ranked candidate chunks. The system then generates a combined hybrid ranking by identifying any chunks that appear in both result sets, elevating those overlapping chunks within the combined list, ranking the overlapping chunks relative to one another based on underlying lexical and semantic scoring information, and interleaving the remaining results according to a predetermined merging rule. A top subset of K document chunks is then selected from the merged list, and these chunks are provided to an LLM, which generates an answer to the user query based at least in part on the selected chunks.

The interleaving rule can alternate between top-ranked lexical and vector candidates, producing a balanced combined ranking. In certain implementations, overlapping chunks may be given a weighted relevance score that reflects corroboration across retrieval modalities. The system may also incorporate named-entity recognition (NER) and date-standardization logic to refine both the lexical and vector searches, ensuring that retrieval results are constrained to relevant companies, analysts, events, or publication windows. The system may also classify the user query into one of several intent categories—such as company-view, country-view, change-in-metric, or report-search intents—and cause the LLM to generate an answer using a standardized template associated with the detected intent. The system may be deployed within a private, hybrid, or containerized computing environment. In certain embodiments, the Hybrid RAG system executes entirely within an enterprise-controlled environment, while in other embodiments the system invokes a remotely hosted large language model via a secure application programming interface (API), such that selected input tokens or reference content are transmitted to an external LLM service for inference in accordance with applicable security, privacy, and compliance requirements.

The hybrid RAG system may be used for sell-side financial research, where analysts must provide timely, accurate, and consistent answers to client inquiries. Sell-side research environments rely heavily on structured, curated, and frequently updated research content, including company reports, thematic notes, macroeconomic commentary, and analyst models. Traditional vector-only RAG pipelines often fail to identify the most relevant passages when users refer to specific tickers, analysts, sectors, dates, or terminology that appear in metadata fields but not in semantically similar text. Conversely, a lexical-only search may overlook conceptually relevant material that uses different wording or phrasing. By combining lexical and vector retrieval signals, the disclosed hybrid system ensures that (i) metadata-driven references such as tickers, analyst names, and sector tags are captured through the lexical branch, while (ii) conceptually related research is surfaced through the semantic branch. The hybrid ranking process further elevates passages corroborated by both modalities, producing a highly reliable set of context materials for downstream LLM generation. As a result, answers produced by the system are more aligned with firm-approved research, more consistent with analyst views, and less likely to include outdated, incomplete, or tangential material.

The disclosed architecture further provides technical benefits beyond improvements to analyst workflow. The hybrid retrieval approach reduces false-positive retrieval results by requiring agreement across lexical and vector modalities, thereby improving retrieval precision. The elevation and internal ranking of overlapping results reduce noise in the combined ranking and improve the quality of the top-K chunks used for LLM conditioning. The use of intent classification and template-driven formatting constrains output variability and reduces the risk of LLM hallucination by aligning generation with domain-specific communication norms. In addition, pre-processing components such as NER, date standardization, and out-of-domain detection improve system reliability by ensuring that only in-domain queries with identifiable references are allowed to progress into the retrieval pipeline. Finally, in resource-constrained environments, the selection of K chunks based on context-window considerations reduces computational overhead, enabling efficient operation even when using large-scale LLMs.

Accordingly, the present invention provides an integrated, technically robust, and domain-adaptable hybrid RAG system that improves retrieval accuracy, enhances contextual grounding for LLMs, and supports consistent, high-fidelity answer generation across large and complex research corpora. These and other benefits that can be realized via embodiments of the present invention will be apparent from the description that follows.

FIGURES

Various embodiments of the present invention are described herein by way of example in connection with the following figures.

FIGS. 1 and 2 are block diagrams of a hybrid RAG system according to various embodiments of the present invention.

FIG. 6 illustrates, according to certain embodiments of the present invention, examples of how the date-standardization module may interpret and transform date information contained in user queries.

Figure 7:
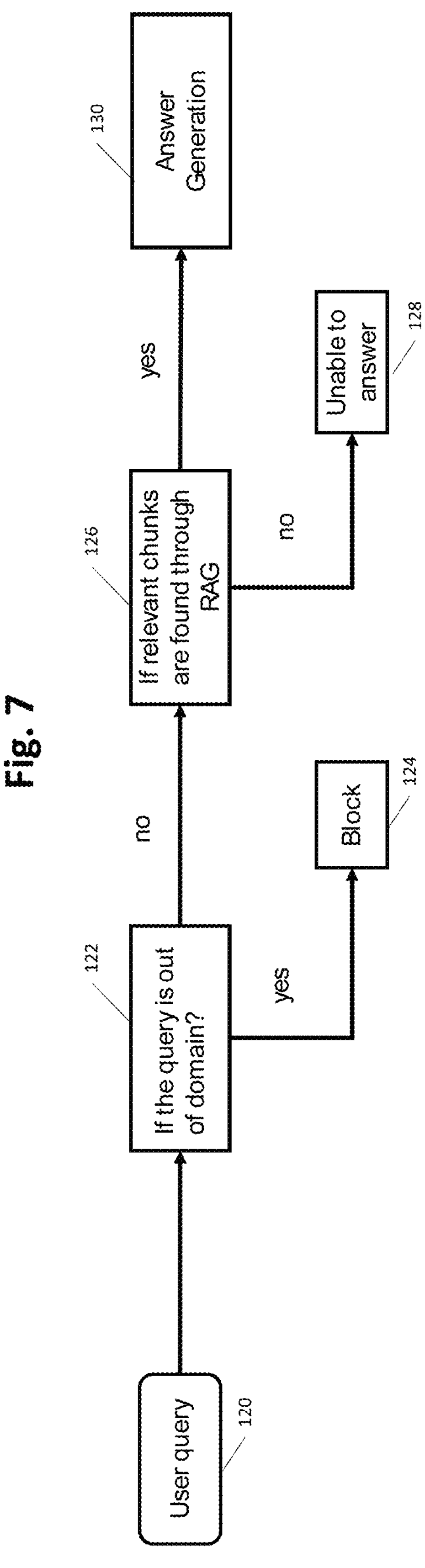

FIG. 7 an out-of-domain control process according to various embodiments of the present invention.

Figure 8:
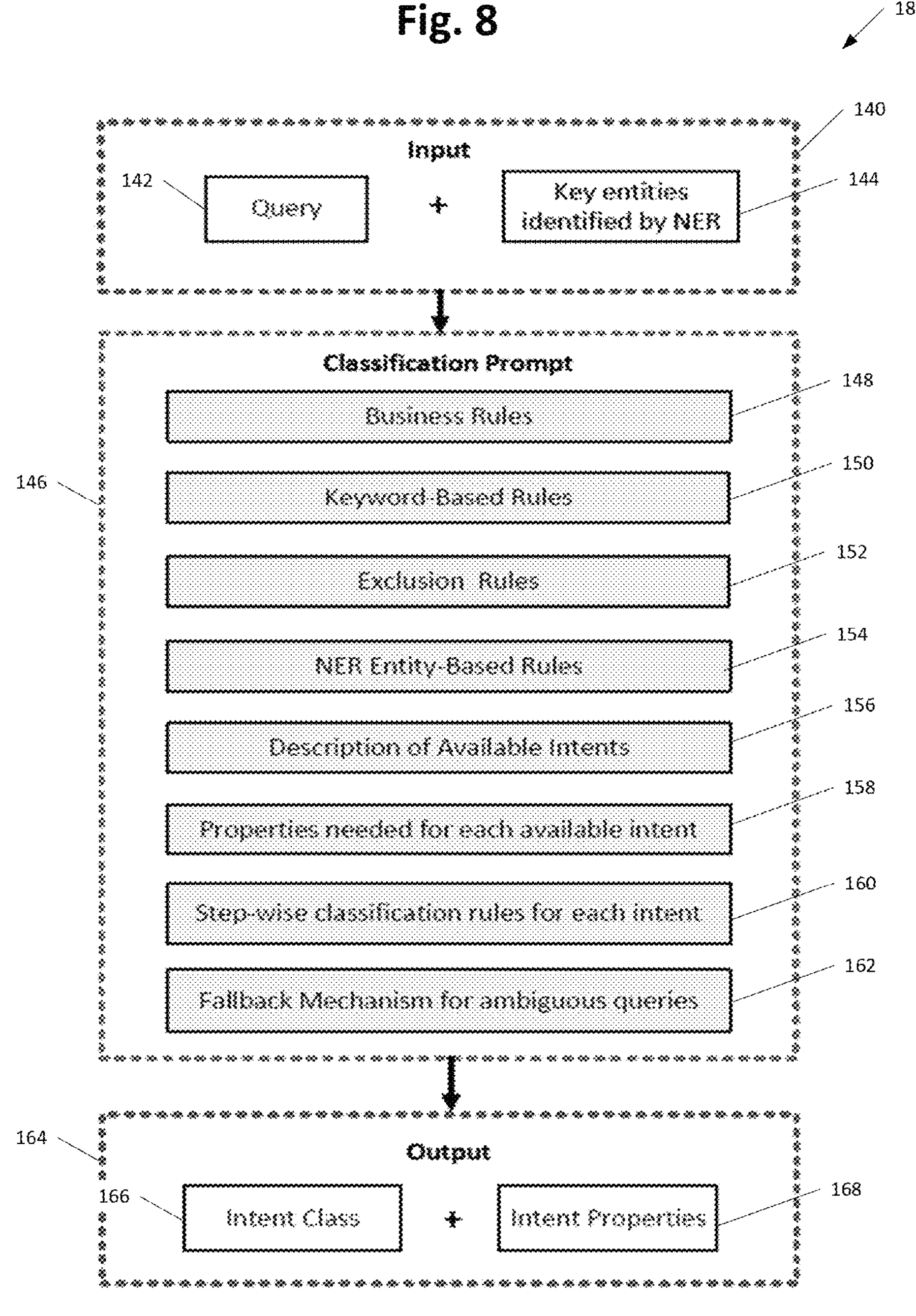

FIG. 8 illustrates, according to one embodiment of the present invention, an example implementation of the orchestration component of the hybrid RAG system, which is configured to classify the pre-processed user query into one of a predetermined set of intent categories and to determine corresponding intent-specific properties used for downstream retrieval and answer generation.

FIG. 9 illustrates, according to one embodiment of the present invention, an example standardized output format generated when the orchestration component classifies a user query as belonging to a company-view intent category.

DESCRIPTION

Embodiments of the present disclosure relate to systems and methods for performing hybrid lexical-vector retrieval operations within a retrieval-augmented generation (RAG) framework. The disclosed architecture may be employed in environments such as sell-side financial research, where analysts are expected to provide consistent, accurate, and up-to-date responses to client inquiries based on a curated body of published research materials. By combining lexical retrieval signals with semantic vector similarity results and applying a multi-stage reranking process, the system identifies the most contextually appropriate reference material for use by a large language model (LLM), enabling the LLM to generate answers grounded in the underlying research corpus.

Figure 1:
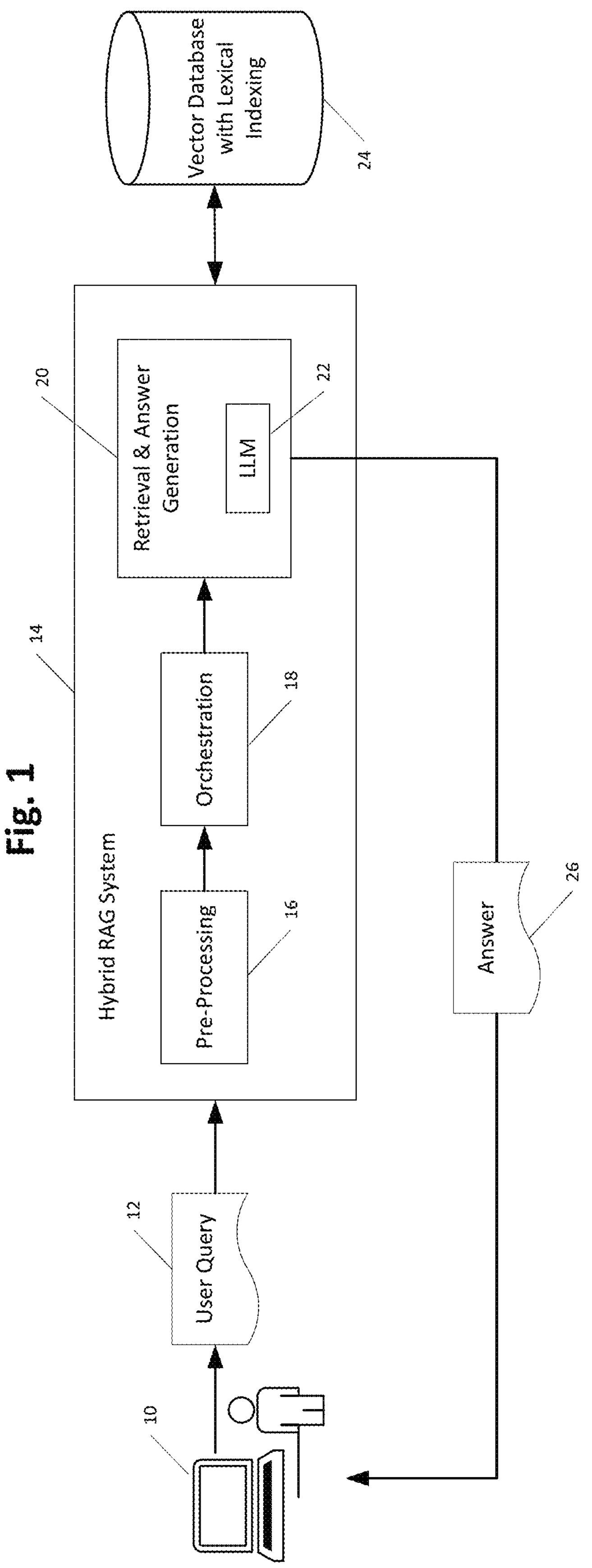

FIG. 1 illustrates, according to various embodiments of the present invention, an example high-level architecture of a hybrid RAG system 14 configured to receive a user query 12 originating from a user device 10 and to generate a corresponding answer 26. The hybrid RAG system 14 includes a pre-processing component 16, an orchestration component 18, and a retrieval and answer-generation component 20. The retrieval and answer-generation component 20 interfaces with a vector database 24 that stores document chunks or embeddings together with associated lexical indexing data. In certain embodiments, the database 24 may store research materials produced by a sell-side firm, including reports, commentary, models, or other published content, and the system may retrieve and utilize this material as the source from which answers are generated.

In general operation, a user submits a natural-language query 12, which is ingested by the hybrid RAG system 14 and initially processed by the pre-processing component 16. As described at a high level in FIG. 2, the pre-processing component may perform various query-normalization operations, such as recognizing named entities, interpreting date information, and determining whether the query falls within the topical scope handled by the system. These operations prepare the query for downstream retrieval and reduce the likelihood that irrelevant or misinterpreted content is passed to later stages.

Following pre-processing, the query is provided to the orchestration component 18. In embodiments, the orchestration component classifies the user query into one of several predefined intent categories, such as queries seeking a company-level view, change-in-metric information, or a summary of research materials. The orchestration component 18 may then select an appropriate retrieval strategy and configure prompts or other parameters to ensure that the answer-generation stage produces an output consistent with domain conventions. The orchestration stage 18 can therefore establish the retrieval context that governs how the system obtains and evaluates research documents in response to the query.

Figure 3:
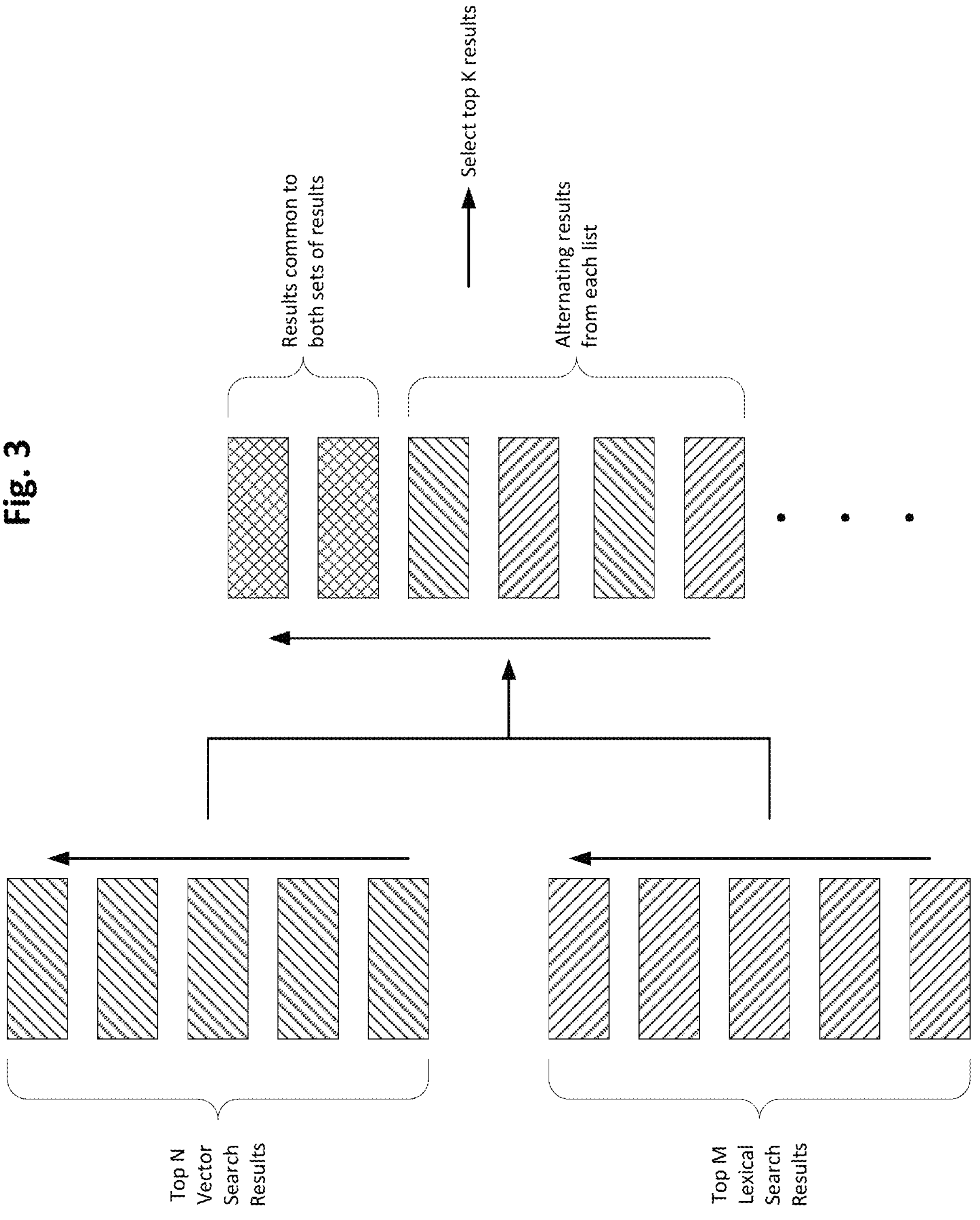
FIG. 3 illustrates ranking of merged results from the lexical and vector similarity searches to identify the top K document chunks according to various embodiments of the present invention.

The retrieval and answer-generation component 20 performs a multi-stage retrieval and ranking process, as further illustrated in the examples of FIGS. 2 and 3. In embodiments, the system first generates, at step 40, an embedded representation of the query using a concept-embedding model. The system then executes two complementary retrieval operations using the embedded query and metadata associated with the research corpus.

In one branch of the retrieval pipeline, the system performs, at step 42, a lexical weighted search to retrieve, from the database 24, a set of document identifiers ("M" documents) whose textual or metadata-based attributes match the query. This lexical retrieval operation may consider fields for the documents in the database 24, such as titles, analyst names, company identifiers, sector categorizations, or other domain-specific metadata. The chunks in the M documents produced at step 42 may be ranked, in descending order, based on a similarity score. At step 44, the system may perform a vector-based similarity search of the database 24 restricted to the chunks returned by the lexical search, thereby identifying those chunks within the lexical set that also exhibit semantic similarity to the embedded query. The results of the lexical and restricted vector searches may then be reranked at step 46 based on weighted lexical relevance scores, semantic similarity scores, or combinations thereof. The output of this branch is therefore a refined, ranked list of candidate chunks.

In one embodiment, the lexical search of step 42 may be implemented using Apache Solr, an open-source enterprise search platform that provides inverted-index-based retrieval capabilities. Solr supports weighted keyword matching, field-specific scoring, faceting, and metadata-aware query processing, which allow the system to evaluate documents based on attributes such as titles, analyst names, company identifiers, sector classifications, or other domain-specific fields. Solr may maintain an index of the documents or document chunks stored in the database 24 and may compute relevance scores that reflect how closely each document's indexed terms correspond to the user query. Although Solr represents one suitable implementation, other lexical or metadata-driven search engines may be used in alternative embodiments.

In a second branch of the retrieval pipeline, the system performs, at step 48, a semantic vector search using the embedded representation of the query and vector embeddings stored in the database 24. This operation produces a set of "N" candidate documents or document chunks whose semantic content is most similar to the query, where N is greater than zero and may differ from, or may equal, M. The results at step 48, in descending order, according to a vector-search scoring function, such as cosine similarity, dot-product similarity, or an inverse distance measure. At step 50, the system may rerank the vector-search results based on semantic similarity scores, recency indicators, metadata relevance, or other weighting factors appropriate for the retrieval task. The output of this branch is therefore a ranked list of N candidate documents or chunks identified primarily through semantic similarity to the query.

The system then merges the lexical and vector results into a single hybrid ranking, at step 52, which is further illustrated in FIG. 3. In FIG. 3, lexical results are represented with back-slash hashing and vector search results are indicated by forward-slash hashing. In this hybrid ranking process, items that appear in both the lexical and vector result sets—shown with cross hashing—are identified and elevated in the combined ranking, reflecting the increased likelihood that such overlapping items are relevant to the query. In addition to elevating the overlapping items as a group, the system may also rank the overlapping document chunks relative to one another based on their respective lexical relevance scores, semantic similarity scores, or a combined or weighted scoring function derived from those underlying rankings. In this manner, overlapping items retain or adjust their internal ordering according to their overall relevance, rather than merely being grouped together without differentiation. In some cases, there may not be any overlapping documents, so the number of overlapping documents is zero or more. After ranking the overlapping items, the remaining results from the two lists may be interleaved or otherwise combined, in descending order by rank, to form a unified, ordered list of candidate chunks or documents. The system then selects a top subset ("K" items) from the merged list for downstream processing.

After elevating items that appear in both the lexical and vector retrieval branches, the system may populate the remaining positions in the merged ranking using any of several interleaving strategies. In one illustrative scenario, the system alternates between the highest-ranked available item from the vector list and the highest-ranked available item from the lexical list (e.g., top vector, top lexical, second vector, second lexical, and so forth). In another scenario, the system may select the highest ranked vector result followed by the top R lexical results, and then the top R ranked vector results, and so on, where R equals two or more. In yet another scenario, the system may interleave results in fixed-size groups, such as selecting the top two ranked vector results, then the top two ranked lexical results, followed by the third and fourth ranked vector results, the third and fourth lexical ranked results, and so forth. These examples are merely illustrative, and in general, the merged ranking may be produced using any deterministic, probabilistic, or learned interleaving technique that combines the two ranked lists after the overlapping items have been placed.

After the hybrid reranking stage selects the top K candidate chunks, the system assembles these chunks into reference text at step 54. In various embodiments, the reference text may include the retrieved chunks themselves, optionally augmented with metadata, summaries, or other contextual material useful for grounding the answer. The selected chunks may be concatenated, ordered according to their ranking, or formatted into a structure suitable for presentation to the LLM 22. In some implementations, the system may further refine, filter, or de-duplicate the selected chunks to avoid redundancy or extraneous material. The reference text produced at step 54 therefore represents the curated subset of corpus content that the system determines to be most relevant for answering the user's query.

In the illustrated embodiments, the value K selected after the hybrid reranking stage need not equal either of the quantities M or N returned by the lexical and vector retrieval branches. The values M and N represent the number of initial candidates identified by each branch, whereas K represents a downstream subset chosen after the system has merged, deduplicated, and reranked the combined results. In various implementations, K may be smaller than M or N, larger than one but not the other, or otherwise independently determined based on retrieval objectives. For example, K may be selected to include only the highest-scoring items across both retrieval modalities or to avoid including low-relevance materials. In certain embodiments, the choice of K may also reflect constraints associated with the context window of the large language model (LLM), such that the total textual content of the selected chunks fits within the maximum prompt size accepted by the model. Accordingly, K may be chosen to balance retrieval quality, diversity, and computational efficiency while ensuring that the assembled reference text remains within the usable capacity of the LLM.

In various embodiments, the augmented data incorporated into the reference text at step 54 may be obtained from multiple sources. For example, the system may retrieve metadata associated with each selected chunk from the database 24, such as document titles, publication dates, analyst identifiers, company identifiers, sector classifications, or other structured attributes. The augmented data may also include information generated during earlier stages of processing, such as named entities identified during pre-processing, standardized date ranges, or intent labels determined by the orchestration component 18. In certain implementations, the database 24 may additionally store summaries, annotations, or other context derived from the underlying research materials, and such information may be incorporated into the reference text. More generally, the augmented data may include any information that assists the LLM 22 in producing an answer that adheres to domain conventions and accurately reflects the underlying research corpus.

At step 56, the system supplies the assembled reference text to a large language model (LLM) 22 together with an instruction prompt generated during the orchestration stage. The prompt may instruct the LLM to synthesize an answer based solely on the provided reference text, to follow a format associated with the identified query intent, or to otherwise constrain the generation process according to domain conventions. The LLM processes the reference text and generates a natural-language answer grounded in the retrieved materials, rather than relying exclusively on the model's internal parametric knowledge. The output of step 56 constitutes the system's final answer to the user query, which is returned to the user as shown in FIG. 1.

Figure 4:
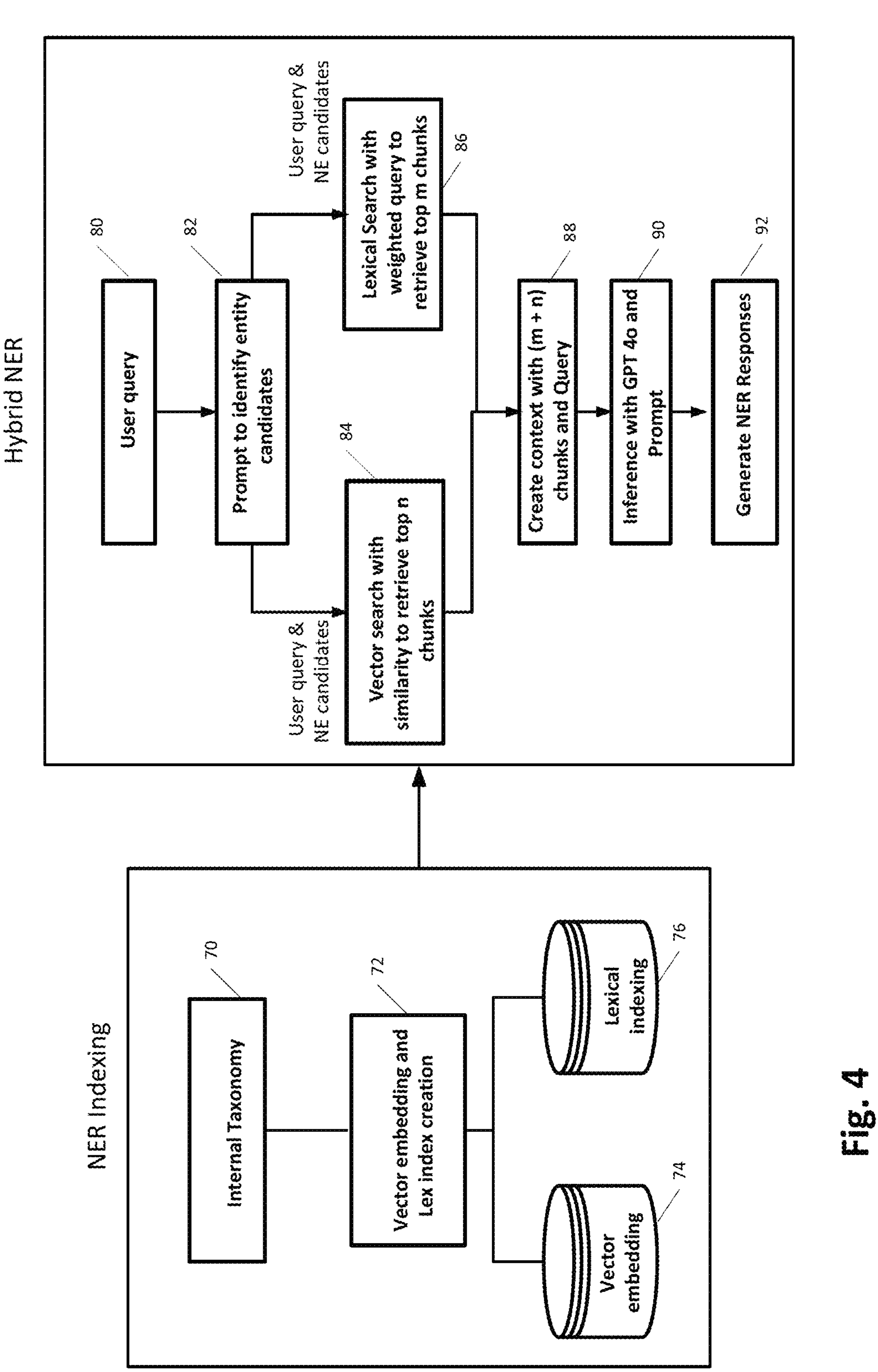
FIG. 4 illustrates NER according to various embodiments of the present invention.

Referring back to FIG. 1, the pre-processing module 16 can, for example, for incoming user queries, perform name entity recognition (NER), date standardization, and out-of-domain control. The NER process can identify companies, analysts, countries, and other financial entities referenced in the user query. As illustrated in FIG. 4, the NER process may begin at step 70 by consulting an internal taxonomy or knowledge graph that includes entity identifiers, synonyms, aliases, boosted terms, coverage information, or other metadata maintained by the research organization. Using this taxonomy, the system generates, at step 72, vector embeddings and lexical index entries for the entities, which are stored in an embedding store 74 and a lexical index 76, respectively, and are periodically updated to maintain accuracy and recency.

When a user query is received at step 80, the system may generate initial entity-candidate predictions at step 82 by prompting the LLM 22 (or other classification component). The system may then perform, at step 84, a vector-similarity search to retrieve chunks that contain semantically similar entities and, in parallel, at step 86, a lexical or weighted Solr search to retrieve chunks matching the query terms or metadata. The candidate entities obtained from these searches may be combined at step 88 with the original query text to construct additional context, which is then processed at step 90 by the LLM 22 to produce, at step 92, a final NER result identifying the most likely entities referenced in the query. This hybrid approach leverages both semantic and lexical retrieval signals to improve the precision and recall of entity extraction compared to prompt-only NER techniques.

In certain embodiments, the NER capabilities of the system may rely on internal research-management datasets that maintain structured information used by the research organization. Such datasets may include, for example, identifiers for companies and analysts, ticker symbols, coverage assignments, synonym lists, alias mappings, boosted terms, geographic attributes, and other metadata commonly used in financial research workflows. These internal data resources may supply the input used to construct or update the taxonomy employed during NER indexing, enabling the system to generate both vector embeddings and lexical index entries for the relevant entities. Because these datasets are updated as research coverage and terminology evolve, the resulting NER indices can be refreshed on a regular basis to maintain accuracy, recency, and relevance.

By integrating these curated metadata sources into the hybrid NER approach, the system improves its ability to accurately identify references to companies, analysts, countries, and other financial entities within user queries. Experimental evaluations conducted using internal test sets demonstrate that the hybrid NER technique can achieve substantially higher precision, recall, and composite F-scores than prompt-only NER methods, particularly for entity categories where synonymy, aliasing, or inconsistent naming conventions have traditionally contributed to classification errors. The hybrid approach therefore enhances the reliability of downstream retrieval and answer generation by ensuring that the system correctly interprets the entities referenced in user queries.

Figure 5:
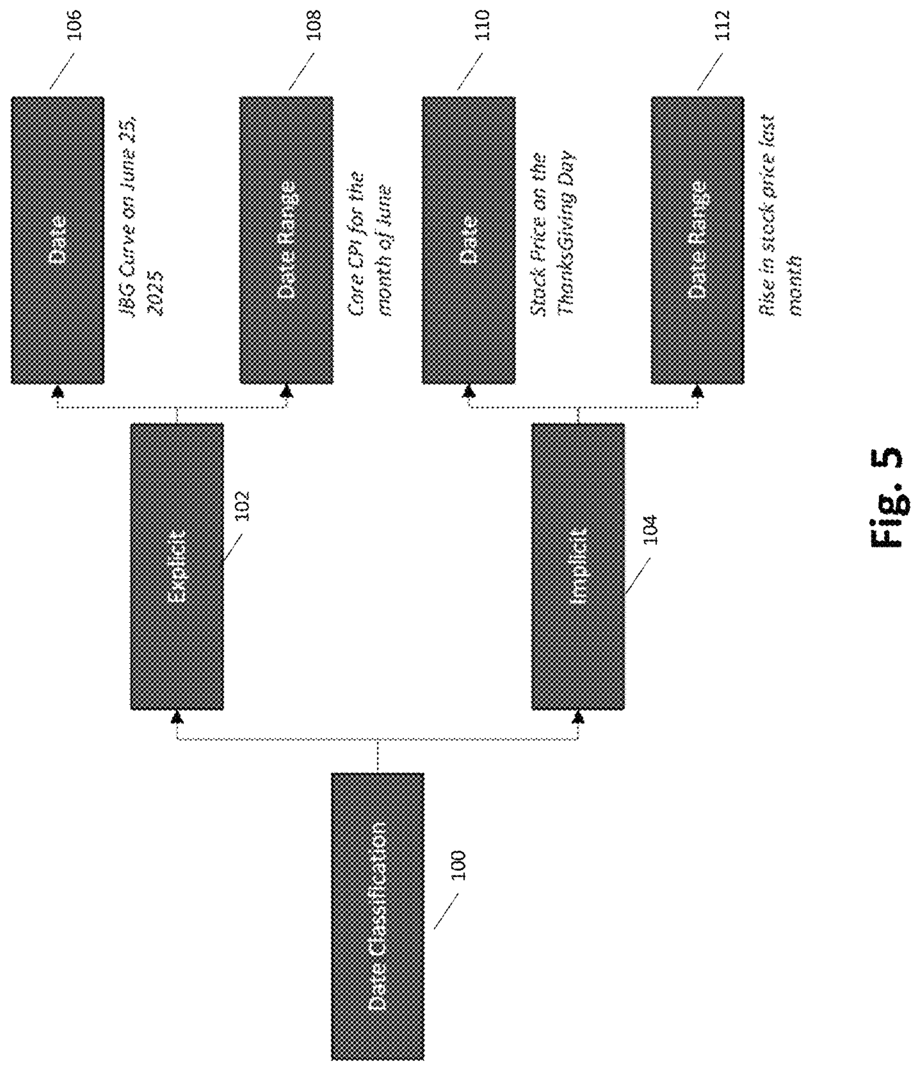
FIG. 5 illustrates a date standardization process according to various embodiments of the present invention.

In certain embodiments, the pre-processing component 16 further performs date standardization, which ensures that downstream lexical and vector retrieval operations are executed over appropriate and accurate publication-date ranges. As shown schematically in FIG. 5, the system may first classify, at step 100, the type of date expression-if any-contained within the user query. The system may determine whether the query includes an explicit date reference or instead conveys only an implicit temporal expression, such as a reference to "last month" or "the most recent quarter."

In embodiments, the system assigns the query to an explicit category at step 102 when the query text contains a specific, identifiable date or period, such as a particular day ("Jun. 25, 2025"), a named month ("for the month of June"), a quarter, or another enumerated temporal interval. Explicit date references may then be normalized into a corresponding structured date or date range, such as converting a reference to "June 2025" into a defined start and end date (step 106 or step 108).

Conversely, the system assigns the query to an implicit category at step 104 when the query lacks an explicit calendar reference but nevertheless contains temporal cues that imply a date or date span. For example, phrases such as "last month," "in July 15 week," "the most recent view," or "historical change over the past year" may be interpreted as implicit indicators. In such cases, the system infers an appropriate date or date range based on predefined rules, publication schedules, recency heuristics, or domain conventions and assigns a corresponding normalized date (step 110 or step 112). xxx FIG. 6 illustrates, according to certain embodiments of the present invention, examples of how the date-standardization module may interpret and transform date information contained in user queries. As described above, the date-standardization process may classify a query as containing an explicit date reference, an implicit date reference, a special-case temporal expression, or no identifiable date reference, and may then infer an appropriate publication-date range for downstream retrieval operations. FIG. 6 provides illustrative examples of this process for a set of representative queries, each evaluated as of a common query date (shown in the third column).

The first column of FIG. 6 lists example natural-language queries. The second column identifies the temporal category assigned to each query by the date-classification module, which may include categories such as "explicit date range," "implicit date range," "special," or "default." The third column shows the date on which the query is assumed to have been submitted for purposes of the example. The fourth column shows the normalized date range produced by the system after applying the categorization logic. The fifth column provides a brief description of the heuristic applied to infer that range.

In the first example, the query "How much did SOFR rise in July?" contains an explicit temporal reference ("July"). Accordingly, the system classifies the query as an explicit date-range query and produces a normalized range that begins at the start of the referenced period and extends through a recency-adjusted boundary derived from the query date. In various embodiments, this recency adjustment may include a one-period extension (e.g., for a day, month, quarter, or year) to ensure the retrieval window captures any research published immediately after the referenced period.

The second example illustrates an implicit date reference, as in "Core US CPI for last month." Because no specific month is stated, the system may infer the most recent completed monthly period based on the query date. The inferred range may therefore begin at the start of the prior month and extend through the query date or another recency-adjusted bound, enabling retrieval of research that analyzes the most recently available economic data.

The third and fourth examples demonstrate special-case temporal expressions that do not fall neatly into explicit or implicit date categories. For example, the query "Main G10 central bank events in July 15 week?" references a particular week associated with scheduled events. In this case, the system may apply domain-specific rules indicating that central-bank event calendars for a given week are typically published during the prior week, and may therefore infer a date range corresponding to the publication window of the relevant research. Similarly, a query such as "CIO IT budgets 2024, 2025" may trigger a special-case rule reflecting that certain thematic or annual reports are released on a quarterly schedule, and the system may infer a range encompassing the most recent publication cycle.

The fifth example, "What is most recent view on obesity market," illustrates a default case in which the query contains no explicit or implicit temporal cues. In such situations, the system may apply a default date-normalization rule that combines a recency window with a broader historical look-back interval to ensure that infrequently published or thematic research is not omitted. For example, the system may identify a recency period (such as the most recent several months) for determining the most current analysis, and may also incorporate an extended historical interval (for example, twelve to eighteen months) to capture the latest relevant research materials that may not be published on a fixed schedule. The resulting date range allows the retrieval engine to surface both the most current and contextually relevant content available in the research corpus.

These examples in FIG. 6 are illustrative only; the system may apply other heuristics, rules, or machine-learned models to classify date expressions and infer appropriate retrieval ranges. The classification categories, range lengths, and logic shown in the figure are not intended to limit the scope of the invention.

In addition to name-entity recognition and date standardization, the pre-processing module 16 may further include an out-of-domain (OOD) control mechanism configured to prevent the system from generating answers to queries that fall outside the scope of the supported domain, such as financial-research topics. FIG. 7 illustrates an example decision flow for such OOD control.

As shown in FIG. 7, upon receiving a user query 120, the system first evaluates, at step 122, whether the query is out of domain. This determination may be performed using one or more classifiers, heuristics, or prompting-based techniques that assess whether the semantic content of the query pertains to the subject areas for which the hybrid RAG system is intended to operate-such as equity research, macroeconomic commentary, analyst insights, or other financial-research materials. Queries directed to unrelated subject matter, such as mathematics, chemistry, programming, translation, personal-identifying information, or other non-supported categories, may be classified as out of domain. If the query is determined to be out of domain, the system may, at step 124, discontinue/block processing and generate response for the user that the query is OOD.

If the query is not classified as out of domain at step 122, the system proceeds to step 126, where it determines whether relevant content can be located through the hybrid lexical-vector retrieval process described above. At this stage, the system performs retrieval using the merged and reranked search techniques and evaluates whether the resulting set of document chunks includes materials sufficiently related to the query to support answer generation. If the retrieval process fails to produce any relevant chunks, the system may generate an "unable to answer" response at step 128, which signals that the query was in domain but no pertinent research content exists or is available for retrieval.

If, however, the retrieval stage produces a predetermined, sufficient number of (e.g., one or more) relevant chunks, the system advances to answer-generation operation 130, where the selected reference text is provided to the LLM 22 for construction of the final answer. This two-stage OOD control process ensures that only in-domain queries supported by actual underlying research content proceed to the LLM, thereby improving accuracy, consistency, and compliance by preventing unsupported or irrelevant answers from being generated.

The OOD mechanism shown in FIG. 7 is merely illustrative; in various embodiments, the determination at step 122 may be performed using rule-based systems, machine-learned classifiers, embedding-similarity scoring, confidence thresholds, or combinations thereof. Likewise, the retrieval relevance test at step 126 may consider similarity scores, metadata constraints, date ranges, intent-classification outputs, or any other indicator of content suitability.

FIG. 8 illustrates, according to one embodiment of the present invention, an example implementation of the orchestration component 18, which is configured to classify the pre-processed user query into one of a predetermined set of intent categories and to determine corresponding intent-specific properties used for downstream retrieval and answer generation. As shown in FIG. 8, the orchestration component may receive, as input 140, the normalized user query 142 together with key entities 144 identified during the NER stage of the pre-processing module 16. In various embodiments, the orchestration module 18 may additionally make use of concept-extraction outputs, standardized date information, or other metadata generated during pre-processing.

In the illustrated embodiment, the orchestration logic is implemented using a classification prompt that applies multiple layers of evaluative criteria to determine the intent of the query. As shown, the classification prompt may include business-rule evaluation logic 148, keyword-based rule logic 150, exclusion-rule logic 152, and NER-entity-based rule logic 154. These rule layers may be used to interpret the query in the context of financial-research conventions, firm-specific guidelines, or recognized patterns in user behavior.

The classification prompt may further employ a description-of-available-intents layer 156 that enumerates the intents supported by the system, such as, in the context of sell-side research, company-view requests, country-view requests, change-in-metric queries, report-search requests, analyst-coverage inquiries, or other domain-specific categories. In the illustrated embodiment, the system defines eight such intent categories, which together span the principal classes of financial-research queries handled by the orchestration module. A properties-determination layer 158 may identify any retrieval parameters or formatting requirements associated with a given intent. A step-wise classification layer 160 may apply hierarchical or sequential logic to distinguish between similar or overlapping intent categories. A fallback mechanism 162 may be invoked when the query matches more than one intent category or when rule-based evaluation produces ambiguous results.

Collectively, these components determine an intent class 166 and a set of intent properties 168, which form the output of the orchestration module 18. The output shown in FIG. 8 is provided to the retrieval and answer-generation component 20, which uses the identified intent and properties to control the behavior of the hybrid lexical-vector retrieval pipeline and to configure the prompts used by the LLM during answer generation.

The architecture illustrated in FIG. 8 is merely one example suitable for use in connection with sell-side financial-research applications. In other embodiments, the orchestration component may employ different rule sets, differently ordered logic layers, additional or fewer modules, or alternative classification mechanisms such as machine-learning models, embedding-similarity scoring, decision trees, or hybrid approaches. Accordingly, FIG. 8 should be understood as illustrating a representative orchestration framework rather than limiting the invention to any particular implementation.

FIG. 9 illustrates, according to one embodiment of the present invention, an example standardized output format generated when the orchestration component 18 classifies a user query as belonging to a company-view intent category. The illustrated response corresponds to a fictional issuer, XYZ Inc., and demonstrates how the system combines (i) structured financial data retrieved via APIs, (ii) narrative content generated from the hybrid retrieval-augmented generation (RAG) process, and (iii) a predefined output template associated with the company-view intent. Templates may be stored in a rules database, configuration file, or other persistent store and may be updated without modifying the underlying retrieval architecture.

As shown in FIG. 9, the standardized response includes multiple sections such as Price Target, Rating, Investment Thesis, Risk to Upside, Risk to Downside, Key Takeaways and Developments, and Source(s). In certain embodiments, fields such as price target, rating, summary financial metrics, and other factual data are retrieved directly from external or internal financial databases through API calls. Because such values are maintained in structured form within a data platform, these fields need not—and typically should not—be produced through the Hybrid RAG pipeline.

In contrast, in the illustrated example, the narrative portion appearing under "Key Takeaways and Developments" is generated using the Hybrid RAG process, which identifies, retrieves, and synthesizes the most relevant passages from the research corpus based on the classified intent, the identified entities, and the pre-processed query context. The combination of API-retrieved structured fields with RAG-generated narrative content allows the system to produce a complete, contextually aligned company-view summary while ensuring factual numerical fields remain authoritative.

FIG. 9 represents only one example of a standardized template associated with the company-view intent. Other intents—such as country-view, change-in-metric, search-and-summary, or analyst-coverage intents—may employ different templates, section headings, or ordering conventions. For example, a change-in-metric intent corresponds to queries seeking historical adjustments to analyst-published values such as price targets, ratings, or outlook revisions for a particular company. Upon identifying this intent, the orchestration module may extract intent-specific properties—including the company name, a market identifier code, the metric of interest, and whether the user is seeking an increase, decrease, or any change in the metric. In certain embodiments, queries classified into the change-in-metric intent may trigger a workflow distinct from the workflow used for company-view requests. For example, the system may (i) perform an API call to a structured financial-research database to obtain a list of all historical changes for the identified company; (ii) apply a filtering prompt or rule set to isolate the specific change event(s) relevant to the user's query; and (iii) format the resulting information into a standardized representation suitable for display or downstream LLM reasoning.

Organizations in other domains may likewise define their own templates to reflect industry-specific reporting norms. One advantage of using predetermined templates is that users become accustomed to a consistent response structure, making the system's outputs easier to read, scan, and compare. Consistent formatting also improves interpretability and reduces user cognitive load, particularly for repeat users familiar with the organization's preferred reporting style. In one embodiment, the LLM is instructed to generate the standardized format through a template-driven prompt provided by the retrieval and answer-generation component 20. The prompt may specify the required sections, headings, ordering, and formatting rules. The system supplies the LLM with: (i) structured data retrieved from APIs, (ii) narrative findings produced by the Hybrid RAG pipeline, and (iii) a formatting specification or schema for the company-view template. Using these inputs, the LLM populates the predefined sections while preserving the standardized structure, ensuring that responses for the same intent category are consistent across queries. Accordingly, FIG. 9 should be understood as illustrating a representative example of how the system integrates structured data, hybrid RAG content, and template-based formatting for a company-view intent, and does not limit the invention to any particular template, arrangement of sections, or data sources.

In various embodiments, the retrieval and answer-generation component 20 includes or communicates with the LLM 22, which is configured to synthesize natural-language answers based on (i) retrieved reference material and (ii) any structured data provided as input. As used herein, an LLM refers to a machine-learning model trained on large text corpora to predict and generate natural-language output. Examples include transformer-based models having billions of parameters and capable of processing input sequences containing both instructions and contextual data.

In the embodiment illustrated in FIG. 1, the LLM 22 is implemented as a component of the Hybrid RAG system 14 itself, executing within the same computing environment as the pre-processing module 16, the orchestration module 18, and the retrieval and answer-generation component 20. In alternative embodiments, the Hybrid RAG system 14 may access the LLM 22 as a remote or cloud-hosted model, such that the LLM is logically external but functionally part of the overall Hybrid RAG pipeline. Thus, the LLM 22 may be implemented as a private model instance, a fine-tuned domain-specific model, or a hosted foundation model (e.g., GPT-4, GPT-40, GPT-5 class models, open-source transformer models, or fine-tuned derivatives).

Communication between the LLM 22 and the other components of the Hybrid RAG system 14 may occur through structured API calls, internal function invocations, message-passing interfaces, or other suitable integration mechanisms. The retrieval and answer-generation component 20 may construct an input prompt that includes (i) retrieved document chunks, (ii) structured values obtained from external databases, (iii) intent-specific instructions, and (iv) a formatting or template specification. The LLM 22 produces an output sequence that is delivered to the user device 10 as the final answer 26 or used by downstream processes within the system.

The pre-processing module 16, orchestration module 18, and retrieval and answer-generation module 20 may each be implemented in software, hardware, or a combination thereof. In one embodiment, these components are implemented as independent software services or "agents," each responsible for a discrete stage of query handling. The agents may communicate with one another through message-passing interfaces, remote procedure calls, service buses, shared databases, or other inter-process communication mechanisms. In another embodiment, the modules 16, 18, and 20 are implemented as components of a microservices architecture, wherein each module executes on one or more servers or containers and scales independently. In still other embodiments, the modules may be implemented as functions in a shared application executed on a single host machine. Each module may be executed using conventional computing hardware, including multi-core processors, GPUs, TPUs, or cloud-based compute resources. In that connection, the Hybrid RAG system 14 can include one or more processors (e.g., GPUs, TPUs) and associated memory storing instructions which, when executed, cause the processors to perform the operations described herein. The system architecture is not limited to any particular programming language, runtime, or scheduling approach.

The Hybrid RAG system 14 may be deployed in various computing environments. In one embodiment, the system operates as a set of server-side processes executing on one or more physical or virtual machines within an enterprise data center. In another embodiment, the system is deployed as a collection of containerized services (e.g., using Docker, Kubernetes, or similar orchestration frameworks) that permit scalable distribution of the pre-processing, orchestration, retrieval, and LLM-interaction workloads. In yet another embodiment, the system is deployed using a cloud computing platform, such as AWS, Azure, or Google Cloud, where individual components of the pipeline (e.g., vector search, metadata storage, LLM inference, or classification logic) may be executed as managed services. The architecture may utilize load balancers, distributed processing, caching layers, and high-availability clusters to ensure performance and reliability. The system is not limited to any particular deployment topology and may run in hybrid environments combining on-premise systems with cloud-based components.

The vector database 24 may store document embeddings and related metadata used by the semantic-retrieval branch of the Hybrid RAG pipeline. A vector embedding is a numerical representation of a document or document chunk in a high-dimensional space produced by an embedding model trained to map semantically similar text to nearby points in that space. The embedding model may be a transformer-based encoder, a sentence-embedding model, or any other neural representation function. The vector database 24 may be implemented using any storage engine optimized for similarity search, including FAISS-based systems, approximate nearest-neighbor (ANN) indexes, or specialized vector-storage platforms (e.g., Milvus, Pinecone, Weaviate, Vespa). The database may maintain both (i) the vector representation of each chunk and (ii) corresponding metadata such as document identifiers, timestamps, sentiment markers, analyst identifiers, sector classifications, or other domain-specific attributes. To populate the vector database, the system may segment research documents into chunks and compute an embedding for each chunk using the embedding model. These embeddings may be updated periodically when new research is published or when a more advanced embedding model becomes available. The vector database supports similarity queries that return the document chunks whose vector representations are most similar to an embedded user query.

In one general aspect, therefore, the present invention is directed to computer-implements systems and methods for generating an answer to a user query via retrieval-augmented generation. A system according to embodiments of the present invention comprises a vector database storing a plurality of document chunks and corresponding vector embeddings, a lexical indexing system storing lexical index entries for the plurality of document chunks, and a retrieval-augmented generation (RAG) system. The RAG system comprise one or more programmed processors, and is in communication with the vector database and with the lexical indexing system. The RAG system is configured, via programming, to receive the user query from a user; generate an embedded representation of the user query; generate a set of M ranked candidate document chunks based at least in part on a lexical search of the lexical indexing system using the user query; generate a set of N ranked candidate document chunks based at least in part on a vector similarity search of the vector database using the embedded representation of the user query; and generate a combined rank list of document chunks. Generating the combined rank list can comprise: identifying zero or more document chunks common to both the set of M ranked candidate document chunks and the set of N ranked candidate document chunks; ranking the zero or more document chunks common to both the set of M ranked candidate document chunks and the set of N ranked candidate document chunks higher in the combined rank list than document chunks not common to both the set of M ranked candidate document chunks and the set of N ranked candidate document chunks; adding to the combined rank list by interleaving, according to a predetermined merging rule and based on ranking, document chunks not common to both the set of M ranked candidate document chunks and the set of N ranked candidate document chunks; and selecting a set of K document chunks from the combined rank list, wherein the set of K document chunks comprises a highest-ranked K document chunks from the combined rank list. The RAG system is also configured to provide the set of K document chunks to a large language model (LLM) of the RAG system to generate an answer to the user query based at least in part on the set of K document chunks; and then provide the answer to user.

A method according to embodiments of the present invention comprises: storing, in a vector database, a plurality of document chunks and corresponding vector embeddings; and storing, in a lexical indexing system, lexical index entries for the plurality of document chunks. The method also comprises, by the RAG system: receiving the user query from a user; generating an embedded representation of the user query; generating a set of M ranked candidate document chunks based at least in part on a lexical search of the lexical indexing system using the user query; generating a set of N ranked candidate document chunks based at least in part on a vector similarity search of the vector database using the embedded representation of the user query; and generating a combined rank list of document chunks. Generating the combined rank list can comprise identifying zero or more document chunks common to both the set of M ranked candidate document chunks and the set of N ranked candidate document chunks; ranking the zero or more document chunks common to both the set of M ranked candidate document chunks and the set of N ranked candidate document chunks higher in the combined rank list than document chunks not common to both the set of M ranked candidate document chunks and the set of N ranked candidate document chunks; adding to the combined rank list by interleaving, according to a predetermined merging rule and based on ranking, document chunks not common to both the set of M ranked candidate document chunks and the set of N ranked candidate document chunks; and selecting a set of K document chunks from the combined rank list, wherein the set of K document chunks comprises a highest-ranked K document chunks from the combined rank list. The method also comprises the steps of providing the set of K document chunks to a large language model (LLM) of the RAG system to generate an answer to the user query based at least in part on the set of K document chunks; and providing the answer to user.

According to various implementations, adding document chunks to the combined ranked list can comprise alternating, according to the predetermined merging rule, between a highest-ranked remaining lexical document chunk and a highest-ranked remaining vector document chunk.

According to various implementations, generating the combined rank list further comprises ranking the zero or more document chunks common to both the set of M ranked candidate document chunks and the set of N ranked candidate document chunks based on based on underlying lexical and semantic scoring associated with the ranked candidate document chunks.

According to various implementations, the lexical search of the lexical indexing system produces M candidate document chunks, and generation of the set of M ranked candidate document chunks is further based on a vector similarity search restricted to the M candidate document chunks.

According to various implementations, the value for K is selected such that a total textual content of the K document chunks fits within a maximum context window of the LLM.

According to various implementations, the lexical search is performed using Apache Solr.

According to various implementations, the RAG system is further configured to rerank the N ranked candidate document chunks based at least in part on semantic similarity and document recency.

According to various implementations, the RAG system is configured: for use with a specified use case domain; to perform named entity recognition (NER) on the user query to identify one or more identified entities referenced in the user query; to use the one or more identified entities as part of the lexical search and the vector similarity search performed by the RAG system; and to perform NER using domain-specific entity definitions associated with the specified use case domain. Also, the RAG system may be further configured to determine whether the user query is out-of-domain for the specified use case domain and, responsive to a determination that the query is out-of-domain, to restrict answer-generation operations.

According to various implementations, the specified use case domain comprises sell-side research. According to various implementations, the RAG system can be further configured to perform date standardization on the user query to identify a standardized date range (which can be, for example, a single day or multiple days), and to use the standardized date range in both the lexical search and the vector similarity search performed by the RAG system.

According to various implementations, the RAG system is further configured, via programming, make a classification of the user query into one of a predetermined plurality of intent categories and to determine one or more intent-specific retrieval parameters based on the classification. In such circumstances, the RAG system can be further configured to cause the LLM to generate the answer using a standardized answer format associated with the classification. Also, the standardized answer format may comprise a template specifying a required ordering, section structure, or presentation format, and wherein the RAG system provides the template to the LLM together with the set of K document chunks.

According to various implementations, the LLM is deployed within a private computing environment with the RAG system. The private computing environment can comprises a containerized deployment executed within an isolated virtual private cloud, and wherein the LLM is executed on compute nodes of the private computing environment without external network access during inference.

While the present invention has been described in connection with exemplary embodiments, it will be understood by those skilled in the art that various changes, substitutions, and modifications may be made without departing from the scope of the invention. The systems and methods described herein may be implemented in a wide variety of computing environments and configurations, and references to particular hardware, software, or architectural components are illustrative rather than limiting. Unless otherwise stated, no particular order of operations is required, and the steps of any described methods may be rearranged, combined, or omitted in accordance with the design objectives. Furthermore, the use of singular terms (e.g., "a," "the," "one") should be understood to encompass both singular and plural instances unless clearly indicated otherwise.

Nothing in the foregoing description is intended to imply that any particular feature, element, or embodiment is essential to the invention or required for every implementation. Where features are described in relation to separate embodiments, such features may be combined in a single embodiment unless explicitly stated otherwise. The scope of the invention is defined solely by the claims and their legal equivalents, and not by any examples provided in the description.

What is claimed is:

1. A computer-implemented system for generating an answer to a user query, the system comprising:

a vector database storing a plurality of document chunks and corresponding vector embeddings;

a lexical indexing system storing lexical index entries for the plurality of document chunks;

a retrieval-augmented generation (RAG) system, comprising one or more programmed processors, wherein the RAG system is in communication with the vector database and with the lexical indexing system, and wherein the RAG system is configured, via programming, to:

receive the user query from a user;

generate an embedded representation of the user query;

generate a set of M ranked candidate document chunks based at least in part on a lexical search of the lexical indexing system using the user query;

generate a set of N ranked candidate document chunks based at least in part on a vector similarity search of the vector database using the embedded representation of the user query;

generate a combined rank list of document chunks by:

identifying one or more document chunks common to both the set of M ranked candidate document chunks and the set of N ranked candidate document chunks;

ranking the one or more document chunks common to both the set of M ranked candidate document chunks and the set of N ranked candidate document chunks higher in the combined rank list than document chunks not common to both the set of M ranked candidate document chunks and the set of N ranked candidate document chunks;

adding to the combined rank list by interleaving, according to a predetermined merging rule and based on ranking, document chunks not common to both the set of M ranked candidate document chunks and the set of N ranked candidate document chunks; and selecting a set of K document chunks from the combined rank list, wherein the set of K document chunks comprises a highest-ranked K document chunks from the combined rank list;

provide the set of K document chunks to a large language model (LLM) of the RAG system to generate an answer to the user query based at least in part on the set of K document chunks; and provide the answer to user.

2. The system of claim 1, wherein adding document chunks to the combined ranked list comprises alternating, according to the predetermined merging rule, between a highest-ranked remaining lexical document chunk and a highest-ranked remaining vector document chunk.

3. The system of claim 1, wherein generating the combined rank list further comprises ranking the one or more document chunks common to both the set of M ranked candidate document chunks and the set of N ranked candidate document chunks based on based on underlying lexical and semantic scoring associated with the ranked candidate document chunks.

4. The system of claim 1, wherein:

the lexical search of the lexical indexing system produces M candidate document chunks; and generation of the set of M ranked candidate document chunks is further based on a vector similarity search restricted to the M candidate document chunks.

5. The system of claim 1, wherein a value for K is selected such that a total textual content of the K document chunks fits within a maximum context window of the LLM.

6. The system of claim 1, wherein the lexical search is performed using Apache Solr.

7. The system of claim 1, wherein the RAG system is further configured to rerank the N ranked candidate document chunks based at least in part on semantic similarity and document recency.

8. The system of claim 1, wherein the RAG system is configured:

for use with a specified use case domain;

to perform named entity recognition (NER) on the user query to identify one or more identified entities referenced in the user query;

to use the one or more identified entities as part of the lexical search and the vector similarity search performed by the RAG system; and to perform NER using domain-specific entity definitions associated with the specified use case domain.

9. The system of claim 8, wherein the RAG system is further configured to determine whether the user query is out-of-domain for the specified use case domain and, responsive to a determination that the query is out-of-domain, to restrict answer-generation operations.

10. The system of claim 9, wherein:

the specified use case domain comprises sell-side research; and the RAG system is further configured to perform date standardization on the user query to identify a standardized date range, and to use the standardized date range in both the lexical search and the vector similarity search performed by the RAG system.

11. The system of claim 1, wherein the RAG system is further configured to perform date standardization on the user query to identify a standardized date range, and to use the standardized date range in both the lexical search and the vector similarity search performed by the RAG system.

12. The system of claim 1, wherein the RAG system is further configured, via programming, make a classification of the user query into one of a predetermined plurality of intent categories and to determine one or more intent-specific retrieval parameters based on the classification.

13. The system of claim 12, wherein the RAG system is further configured to cause the LLM to generate the answer using a standardized answer format associated with the classification.

14. The system of claim 13, wherein the standardized answer format comprises a template specifying a required ordering, section structure, or presentation format, and wherein the RAG system provides the template to the LLM together with the set of K document chunks.

15. The system of claim 1, wherein the LLM is deployed within a private computing environment with the RAG system.

16. The system of claim 15, wherein the private computing environment comprises a containerized deployment executed within an isolated virtual private cloud, and wherein the LLM is executed on compute nodes of the private computing environment without external network access during inference.

17. A computer-implemented method for generating an answer to a user query, the method comprising:

storing, in a vector database, a plurality of document chunks and corresponding vector embeddings;

storing, in a lexical indexing system, lexical index entries for the plurality of document chunks; and by a retrieval-augmented generation (RAG) system, comprising one or more programmed processors, and in communication with the vector database and with the lexical indexing system:

receiving the user query from a user;

generating an embedded representation of the user query;

generating a set of M ranked candidate document chunks based at least in part on a lexical search of the lexical indexing system using the user query;

generating a set of N ranked candidate document chunks based at least in part on a vector similarity search of the vector database using the embedded representation of the user query;

generating a combined rank list of document chunks by:

identifying one or more document chunks common to both the set of M ranked candidate document chunks and the set of N ranked candidate document chunks;

ranking the one or more document chunks common to both the set of M ranked candidate document chunks and the set of N ranked candidate document chunks higher in the combined rank list than document chunks not common to both the set of M ranked candidate document chunks and the set of N ranked candidate document chunks;

adding to the combined rank list by interleaving, according to a predetermined merging rule and based on ranking, document chunks not common to both the set of M ranked candidate document chunks and the set of N ranked candidate document chunks; and selecting a set of K document chunks from the combined rank list, wherein the set of K document chunks comprises a highest-ranked K document chunks from the combined rank list;

providing the set of K document chunks to a large language model (LLM) of the RAG system to generate an answer to the user query based at least in part on the set of K document chunks; and providing the answer to user.

18. The method of claim 17, wherein generating the combined rank list comprises alternating, according to the predetermined merging rule, between a highest-ranked remaining lexical document chunk and a highest-ranked remaining vector document chunk.

19. The method of claim 17, wherein generating the combined rank list further comprises ranking the one or more document chunks common to both the set of M ranked candidate document chunks and the set of N ranked candidate document chunks based on an overlap weight.

20. The method of claim 17, wherein:

the lexical search of the lexical indexing system produces M candidate document chunks; and generating the set of M ranked candidate document chunks is further based on a vector similarity search restricted to the M candidate document chunks.

21. The method of claim 17, wherein selecting the set of K document chunks comprises selecting a value of K such that a total textual content of the K document chunks fits within a maximum context window of the LLM.

22. The method of claim 17, wherein:

the RAG system is for use with a specified use case domain, the specified use case domain comprising sell-side research;

the method further comprises:

performing named entity recognition (NER) on the user query to identify one or more identified entities referenced in the user query, wherein the NER uses domain-specific entity definitions associated with the specified use case domain;

performing date standardization on the user query to identify a standardized publication-date range; and using the one or more identified entities and the standardized publication-date range in both the lexical search and the vector similarity search performed by the RAG system.

23. The method of claim 22, wherein:

the method further comprises making a classification of the user query into one of a predetermined plurality of intent categories and determining one or more intent-specific retrieval parameters based on the classification; and providing the answer comprises causing, by the RAG system, the LLM to generate the answer using a standardized answer format associated with the classification.

* * * * *